Patented Aug. 28, 1934

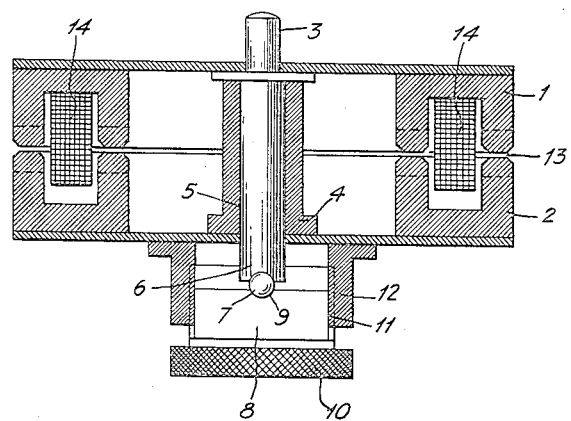

1,971,463

UNITED STATES PATENT OFFICE 1,971,463

SYNCHRONOUS MOTOR IN PARTICULAR FOR TALKING MACHINES

Werner Rothe and Franz Saar, Berlin, Germany, assignors to Telefunken Gesellschaft fur Drahtlose Telegraphie m. b. H., Berlin, Germany, a corporation of Germany Application June 3, 1933, Serial No. 674,138
In Germany June 8, 1932

6 Claims. (Cl. 172—275)

The invention relates to a synchronous driving motor for talking machines, apparatus for picture telegraphy and the like, and which is of utmost simple construction.

It has already been proposed to produce a synchronous motor having a single coil, arranged co-axial to the rotating axis between stator and rotor. In this case stator and rotor have the same number of teeth. The object of the present invention is a further development of the aforementioned motor namely in accordance with the invention, stator and rotor are produced completely alike. In the new motor the air gap is no longer parallel disposed to the rotating axis, but at a right angle thereto, whereby the advantage is obtained that the leakage field which may cause hum noises, is much lower due to the greater distance of the turntable from the air gap. Furthermore the screening effect of the arms carrying the poles is most favorably noticeable. A further advantage resides in the fact, that an axial displacement of the rotor is possible so that the required torque can be accurately adjusted. In the new arrangement the individual parts of the motor need no longer be produced with great accuracy as is necessary for the known motors wherein the air gap is to be accurately maintained. As a result of the construction of the motor in accordance with the invention the air gap can at any time later be readjusted.

The invention will be better understood from the following description when considered in connection with the accompanying drawing, and its scope will be pointed out in the appended claims.

An embodiment of the invention is shown in the accompanying drawing by way of example. Herein is 1 the rotor and 2 the stator preferably made of cast iron and which are of completely identical construction. Both consist of an U-shaped rotational cross section and they are provided with a number of teeth corresponding with one of the desired synchronous number of revolutions. The coil 14 fed by alternating current is disposed within the space formed by the U-shaped profiles. Rotor 1 is rigidly connected with the turntable shaft 3. Stator 2 which may be fixedly secured in any manner within the casing, is provided with a hub 4 having a bore 5 through which the shaft of the turntable is passed. The lower end 6 of the turntable shaft has a ball 7 pressed thereinto which is supported by the thrust bearing 8. This bearing 8 has a hollowed impression 9 through which the position of ball 7 and thus that of the turntable shaft 3 is determined. The thrust bearing 8 furthermore is associated with an adjustment screw 10 displaceable by means of thread 11 relative to the nut 12 fastened to the stator 2. In this manner the air gap 13 between rotor 1 and stator 2 can always be adjusted to correspond with the operating conditions.

In order to further reduce the leakage effect the edges of rotor and stator adjacent the air gap may be chamfered.

We claim:

1. A synchronous motor including a single exciting coil and identically constructed rotor and stator members arranged to co-operate with said coil.

2. A synchronous motor including a single exciting coil and identically constructed rotor and stator members arranged to co-operate with said coil, said members having an U-shaped cross section.

3. A phonograph drive mechanism including a synchronous motor provided with an exciting coil and with stator and rotor members arranged to form an annular air gap perpendicular to the axis of said drive mechanism.

4. A synchronous motor including stator and rotor members, an exciting coil mounted within said members, and means for adjusting the spacing between said members.

5. A synchronous motor including stator and rotor members, an exciting coil mounted within said members, means for adjusting the spacing between said members, and means for locking said members in their adjusted relation.

6. A synchronous motor including an exciting coil and identically shaped cast iron stator and rotor members arranged to co-operate with said coil.

WERNER ROTHE.
FRANZ SAAR.